United States Patent
Sato et al.

(10) Patent No.: US 7,578,750 B2
(45) Date of Patent: Aug. 25, 2009

(54) GOLF SHAFT, GOLF CLUB, AND PRODUCTION METHOD FOR GOLF SHAFT

(75) Inventors: Toshiaki Sato, Yokohama (JP); Akira Katsuyama, Yokohama (JP); Michihiko Ayada, Yokohama (JP)

(73) Assignees: NHK Spring Co., Ltd., Kanagawa (JP); Nippon Shaft Co., Ltd., Kanagawa (JP)

( * ) Notice: Subject to any disclaimer, the term of this patent is extended or adjusted under 35 U.S.C. 154(b) by 0 days.

(21) Appl. No.: 12/076,725

(22) Filed: Mar. 21, 2008

(65) Prior Publication Data

US 2008/0242438 A1 Oct. 2, 2008

(30) Foreign Application Priority Data

Mar. 29, 2007 (JP) ............... 2007-087674

(51) Int. Cl.
*A63B 53/12* (2006.01)
(52) U.S. Cl. ............... 473/316; 266/129; 266/132
(58) Field of Classification Search ............... 473/316; 266/129, 132
See application file for complete search history.

(56) References Cited

U.S. PATENT DOCUMENTS

| 3,937,448 A | * | 2/1976 | Fujii et al. | 266/113 |
| 4,204,892 A | * | 5/1980 | Economopoulos | 148/570 |
| 4,444,376 A | * | 4/1984 | Noguchi et al. | 266/117 |
| 4,458,885 A | * | 7/1984 | Akita et al. | 266/117 |

FOREIGN PATENT DOCUMENTS

| JP | 55119119 A | * | 9/1980 |
| JP | 62238332 A | * | 10/1987 |
| JP | 01309927 A | * | 12/1989 |
| JP | 2002060834 A | * | 2/2002 |
| JP | A-2005-013535 | | 1/2005 |
| JP | A-2005-034517 | | 2/2005 |

* cited by examiner

*Primary Examiner*—Stephen L. Blau
(74) *Attorney, Agent, or Firm*—Antnelli, Terry, Stout & Kraus, LLP.

(57) ABSTRACT

A golf shaft includes: a hollow tubular structure; and a gradient structure in which an amount of retained austenite is increased from an approximate center in a thickness direction of the hollow tubular structure to a surface of the hollow tubular structure.

8 Claims, 5 Drawing Sheets

GOLF SHAFT, GOLF CLUB, AND PRODUCTION METHOD FOR GOLF SHAFT

BACKGROUND OF THE INVENTION

1. Field of the Invention

The present invention relates to a metal golf shaft a to a golf club.

2. Description of Related Art

The weight of a metal golf shaft is desirably reduced in order to increase the flight distance of a golf ball. This desire has been met by reduction in wall thickness of a golf shaft having a hollow tubular shape. However, since it is necessary to satisfy the SG standard for ensuring the safety golf shafts, strengthening of the material in golf shafts is necessary in order to reduce the wall thickness thereof.

For example, Japanese Unexamined Patent Application Publications Nos. 2005-34517 and 2005-13535 disclose techniques for strengthening a material of a metal golf shaft. In the technique disclosed in Japanese Unexamined Patent Application Publication No. 2005-34517, an alloy type steel product having a high strength and a high toughness is subjected to sub-zero treating, and a material of a metal golf shaft thereby has a martensite structure. Next, the material of the metal golf shaft is subjected to tempering, so that the toughness thereof is restored. As a result, the metal golf shaft can have strength and toughness. In the technique disclosed in Japanese Unexamined Patent Application Publication No. 2005-13535, amount of retained austenite included in an alloy type steel product having a high strength and a high toughness is adjusted, and a metal golf shaft having a light weight can be superior in strength, toughness, elasticity, and rebound force, and the like.

In the conventional techniques, in order that a material of golf shaft is uniform in a thickness direction and in a longitudinal direction, material composition, metal structure, grain size, and hardness are adjusted so that the material of golf shaft is superior in balance of strength and toughness. In the conventional techniques, the material of the golf shaft had to be substantially uniform in a thickness direction and a longitudinal direction regardless of the magnitudes of stresses generated to the golf shaft. However, when a golf shaft is used under a bending stress, the stress is maximal at a surface of the golf shaft. In addition, a high stress is applied to a grip side of the golf shaft. Thus, when a material is adjusted so as to optimize a portion to which a high stress is applied, a portion to which a low stress is applied has an excessive quality. Since retained austenite has a soft structure, the strength and the proof stress are decreased, inferior effects may be obtained. When the amount of retained austenite is increased, the toughness is improved, but the strength is decreased. Due to this, it is difficult to simultaneously improve both the strength and the toughness.

SUMMARY OF THE INVENTION

Therefore, the present invention was made in consideration of the above problems. An object of the present invention is to provide a light weight golf shaft having a high strength and a high toughness by adjusting the amount of retained austenite and grain size in a thickness direction and in a longitudinal direction.

According to one aspect of the present invention, a golf shaft includes: a hollow tubular structure; and a gradient structure in which amount of retained austenite is increased from an approximate center in a thickness direction of the hollow tubular structure to a surface of the hollow tubular structure. In the golf shaft of the present invention, the amount of retained austenite is increased from the thickness center portion of the hollow tubular structure to the surface of the hollow tubular structure. Thus, deformation amount of the golf shaft is larger at the surface portion (that is, toughness of the golf shaft is higher at the surface portion), and strength of the golf shaft is higher by transformation-induced plasticity effect when a stress is applied to the golf shaft. At a portion inside from the surface (that is, a deep portion), the applied stress is small, and the transformation-induced plasticity effect may be small. Due to this, if the amount of the retained austenite is not small at the deep portion, the strength of the golf shaft may be deteriorated. However, in the golf shaft of the present invention, since the amount of the retained austenite is relatively small at the thickness center portion, the strength of the golf shaft can be improved.

When a stress is applied to a metal material including the retained austenite, a soft austenite structure is transformed into a hard martensite structure, and a transformation-induced plasticity effect, which causes a high toughness by dispersion and propagation of distortion, is generated. In the golf shaft of the present invention, the included amount of the retained austenite is increased toward the outside surface of the golf shaft. Thus, at the outside surface of the golf shaft at which the applied stress is larger when the bending force is applied to the golf shaft, the above transformation-induced plasticity is preferentially generated, and the deformation of the golf shaft occurs while the austenite structure is transformed into the martensite structure. That is, the golf shaft has a gradient structure such that the amount of retained austenite is increased from the inside portion of the hollow tubular structure to the outside surface of the hollow tubular structure, so that the generation ability of the transformation-induced plasticity is higher toward the outside surface at which the applied stress is larger in the bending, and the strength and the toughness of the golf shaft can be higher.

Since the transformation-induced plasticity may be small at the deep portion at which the applied stress is relatively small in the bending, it is necessary to improve the strength by reducing the amount of the retained austenite thereat. This action in the thickness direction of the shaft is interactively performed, so that the material can obtain both high strength and high defomability, that is, high toughness.

This advantage is good in straightening of a bent portion. That is, in the straightening, force is applied such that bent golf shaft is forcibly straightened, so that a stress applied to the golf shaft is maximal at the outside surface in the same manner described above. Thus, in the same manner described above, while the deformability (ability of the golf shaft which can be deformed without breakage thereof) in the straightening is obtained at a higher level, the strength can be improved, and breakage of golf shaft in the straightening can be prevented.

According to a preferred embodiment of the present invention, the golf shaft includes 5 to 30 volume % of the retained austenite at an outside surface of the hollow tubular structure and in the vicinity of the outside surface. The position range of the outside surface of the hollow tubular structure and the vicinity of the outside surface may be defined within a depth of 3 μm from the outside surface.

The value range of the above feature may be determined as follows. When the golf shaft includes 30 volume % or less of the retained austenite at an outside surface of the hollow tubular structure and in the vicinity of the outside surface, the breaking load (strength) of the golf shaft can be larger (higher) than that of the conventional technique. That is, when the golf shaft includes more than 30 volume % of the retained austenite at an outside surface of the hollow tubular structure and in the vicinity of the outside surface, the strength of the golf shaft may be lower than that of the conventional technique. When the golf shaft includes 5 volume % or more of the retained austenite at an outside surface of the hollow tubular structure and in the vicinity of the outside surface, the breaking deflection (toughness) of the golf shaft can be larger (higher) than that of the conventional technique. That is, when the golf shaft includes less than 5 volume % of the retained austenite at an outside surface of the hollow tubular structure and in the vicinity of the outside surface, the toughness of the golf shaft may be lower than that of the conventional technique. Thus, when the golf shaft includes 30 volume % or less of the retained austenite at an outside surface of the hollow tubular structure and in the vicinity of the outside surface, the strength and the toughness of the golf shaft which exceed those of the conventional technique can be well-balanced.

In measurement methods of retained austenite, methods may be used employing a microscope or the like. In this application, the measurement values obtained by using an X-ray diffraction method which can perform quantitative evaluation are described. Specifically, in an X-ray diffraction method, a Co target is used, and an (X-ray) tube voltage of 40 kV, a tube electric current of 200 mA, and a scan speed of 1 degree/minute are set. In this condition, X-ray diffraction strength (integral value of wave pattern) of (200) plane and (220) plane of $\gamma$ (austenite) and (200) plane and (211) plane of $\alpha$ are obtained, and average value is obtained from 4 pairs of $\alpha$ and $\gamma$. The entry depth of X-ray from the surface may be about 3 μm in the above measurement condition, so that the position range of the outside surface of the hollow tubular structure and the vicinity of the outside surface may be defined within the depth of 3 μm from the outside surface.

According to a preferred embodiment of the present invention, in the golf shaft, the amount of the retained austenite is different in a longitudinal direction.

When force is applied to a front end of the golf shaft, the distribution of stress generated in a longitudinal direction of the golf shaft is not uniform in the longitudinal direction. Thus, the included amount of the retained austenite is changed in the longitudinal direction, so that the balance of the strength and the toughness in the longitudinal direction can be adjusted to have a desired distribution based on the distribution of stress.

According to a preferred embodiment of the present invention, the golf shaft has a grip side and a head side, and the amount of the retained austenite is larger at the grip side than at the head side. In this embodiment of the present invention, the strength and the toughness of the grip side to which a larger stress is applied in using of the golf shaft can be higher.

The golf shaft may be relatively thick at the grip side and may be relatively thin at the head side. Straightening after quenching and tempering may be performed. This straightening may be used for straightening of a bent portion generated in producing the golf shaft. In the straightening, a grip portion which is relatively thick may be easily broken.

In the above embodiment of the present invention, the amount of the retained austenite at the grip side of the golf shaft, which is easily deformed in the straightening, may be relatively large, so that the bendability is large at the grip side of the golf shaft, and breakage of the grip portion can be prevented. Product failure during the straightening can thereby be prevented.

According to another aspect of the present invention, a golf club has the above golf shaft. In the golf club of the present invention, the golf club can be made thinner and can thereby be made lighter in weight, and it can have a high strength and a high toughness.

According to another aspect of the present invention, a production method for a golf shaft is a production method for the golf shaft of the aspect of the present invention. The golf shaft has: a hollow tubular structure. The method includes: forming a gradient structure in which an amount of retained austenite is increased from an approximate center in a thickness direction of the hollow tubular structure to a surface of the hollow tubular structure. The production method can obtain the same actions and effects as those of the golf shaft of the aspect described in paragraph [0006].

According to a preferred embodiment of the present invention, austenite is generated during heating of the golf shaft, the austenite has an austenite grain size number, and in the golf shaft, at least one of the amount of the retained austenite and the austenite grain size number of the austenite are different in a longitudinal direction. The austenite grain size number indicates the grain size of the austenite generated during heating of the golf shaft, and the smaller the grain size, the larger the austenite grain size number.

When the amount of the retained austenite is different in a longitudinal direction of the golf shaft, this case can obtain the same actions and effects as those of the above embodiment of the golf shaft described in paragraph [0013]. When the austenite grain size number of the austenite generated during heating of the golf shaft is different in a longitudinal direction of the golf shaft, this case can obtain the following actions and the effects. As shown in the Hall-Petch equation, metal strength is proportional to (grain size)$^{-1/2}$, and the finer the grain, the higher the strength. That is, the larger the austenite grain size number, the higher the strength. Thus, the austenite grain size is changed (that is, austenite grain size has a distribution) in the longitudinal direction of the golf shaft, so that the strength in the longitudinal direction can be different at each position, and the golf shaft can have an appropriate strength distribution in the longitudinal direction.

According to a preferred embodiment of the present invention, austenite is generated during heating of the golf shaft, and the austenite has an austenite grain size number of 12.5 or more. As described above, the strength of metal may be proportional to (grain size)$^{-1/2}$, and the finer the grain, the higher the strength. In one of the above embodiments of the present invention, both the strength and the toughness can be improved. Thus, by setting the austenite grain size number of the austenite generated during heating of the golf shaft to be 12.5 or more, the toughness can be maintained, and the strength can be further improved. When the austenite grain size number is less than 12.5, the breaking load and the breaking deflection cannot satisfy desired levels of the golf shaft. Thus, the austenite grain size number is desirably 12.5 or more.

According to the present invention, the distribution condition of the retained austenite is set such that the amount of the retained austenite is larger toward the surface of the hollow tubular structure of the golf shaft. Thus, the golf shaft can have a high strength and a high toughness, and it can be light.

DESCRIPTION OF THE PREFERRED EMBODIMENTS

Construction of Golf Club

Figure 1:
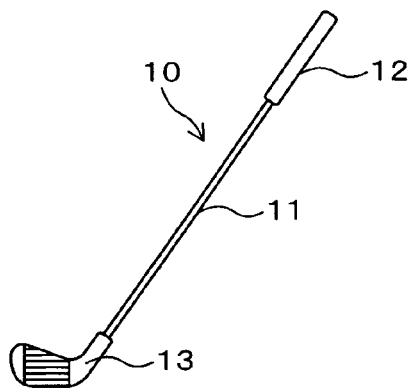
FIG. 1 is a front face view showing one example of a golf club according to the present invention.

FIG. 1 is a front face view showing one example of a golf club according to the present invention. In FIG. 1, an iron club 10 is shown as one example of a golf club. The iron club 10 is equipped with a golf shaft 11, a grip 12 which is a gripping portion, and a head 13 for hitting a golf ball. The golf shaft 11 is in accordance with the present invention.

The golf shaft using the present invention can have a high strength with a thin thickness, and it can be thereby light in weight. Thus, the iron club 10 can be light in weight and can be easily handled.

Construction of Golf Shaft

Figure 2:
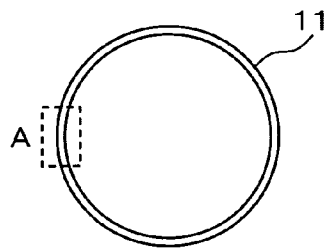
FIG. 2 is cross sectional view of a golf shaft perpendicular to an axis thereof.
Figure 3:
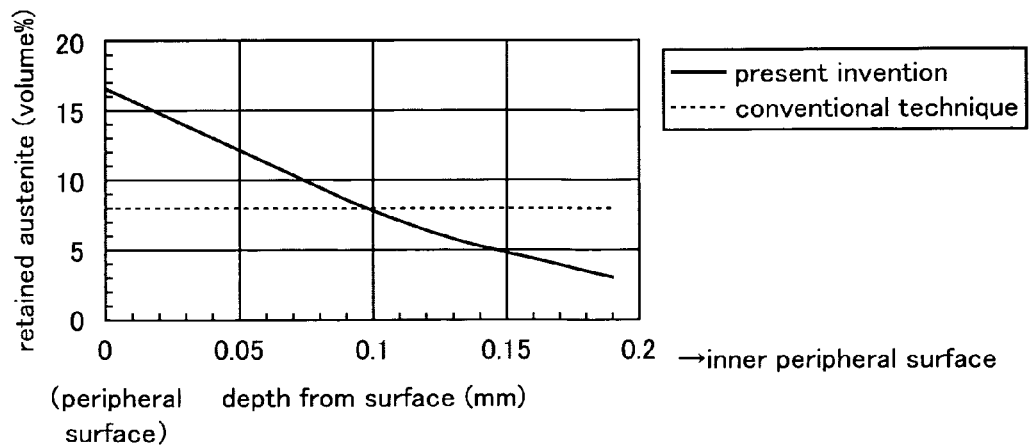
FIG. 3 is a graph showing the amount of retained austenite included at an outside surface thereof.

One example of the golf shaft 11 shown in FIG. 1 will be explained with reference to the Figures. FIG. 3 is a graph showing an amount (volume %) of retained austenite included at a portion A in FIG. 2.

Retained austenite has a soft structure. In general, when a large amount of retained austenite remains, material strength may be decreased. Thus, amount of retained austenite is set to be as small as possible. On the other hand, in an appropriate amount of retained austenite, austenite is transformed into a martensite structure by stress in working due to transformation-induced plasticity. Thus, toughness of the material is greatly increased. This is because the transformation widely and continuously occurs without concentration of transformation region since a martensite structure is hard. In the example of the present invention, distribution of retained austenite is advantageously used, and the toughness of golf shaft is thereby higher.

As shown in FIG. 3, in a cross sectional structure of the golf shaft 11, the conventional technique has an uniform distribution amount of retained austenite in a thickness direction. In contrast, the example of the present invention has a gradient distribution amount of retained austenite such that amount of retained austenite is the largest at an outer surface thereof and it is decreased toward an internal portion thereof. The amount of retained austenite is the smallest at a center portion in a thickness direction.

Figure 4A:
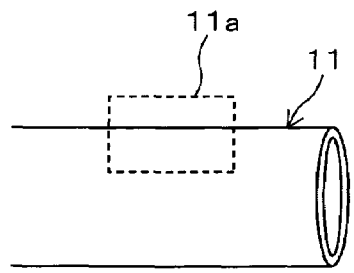
FIGS. 4A and 4B are conceptual diagrams for explaining the stress applied at a cross section of the golf shaft.
Figure 4B:
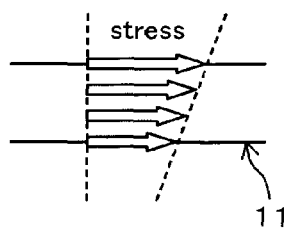

FIGS. 4A and 4B are conceptual diagrams for explaining stress generated at a cross section of the golf shaft when bending force is applied to the golf shaft. FIG. 4A shows a schematic construction of the golf shaft 11. FIG. 4B shows a condition of stress generated at a cross section portion (cross section portion of a portion 11a in FIG. 4A) of the golf shaft 11 in a longitudinal direction when bending force is applied to the golf shaft 11 in an axial direction (longitudinal direction) thereof. When force is applied to the golf shaft 11 so as to bend the golf shaft 11 in the longitudinal direction, as shown in FIG. 4B, in a cross section in the longitudinal direction of the golf shaft 11, the largest stress is applied to an outer side surface portion thereof. When the golf shaft 11 cannot withstand this stress, the golf shaft breaks.

Figure 5:
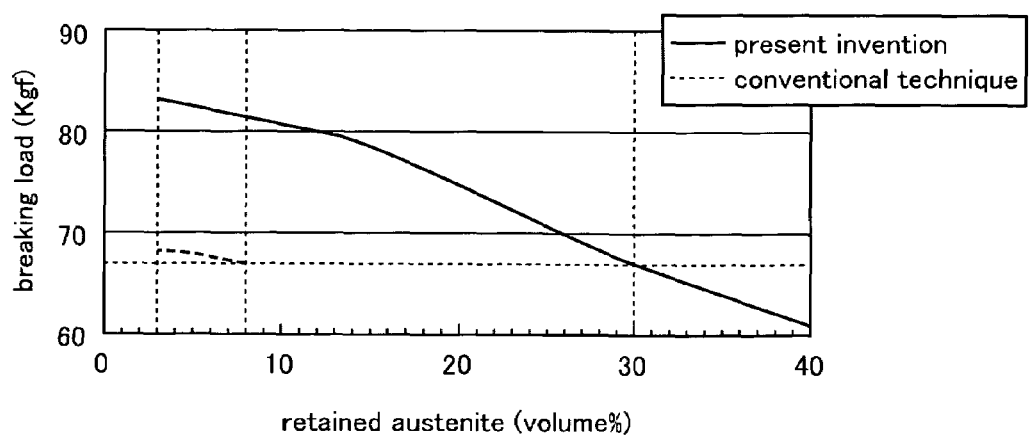
FIG. 5 is a graph showing the relationship between the included amount of the retained austenite and the breaking load.

As shown in FIG. 3, the golf shaft 11 using the present invention has a gradient distribution amount of retained austenite such that the amount of Retained austenite is the greatest at an outer surface of the golf shaft 11 and it decreases toward internal portion of the golf shaft 11. When the stress shown in FIGS. 4A and 4B is applied, a large amount of retained austenite is transformed into a martensite structure by transformation-induced plasticity, and this distribution amount of retained austenite is good for improving the toughness FIG. 5 is one example of data showing the relationship between the included amount (volume %) of retained austenite and the breaking load (kgf) within a range of depth of 3 μm from the surface of the golf shaft 11. In FIG. 5, the data denoted by the solid line is data of a golf shaft using the present invention, and the data denoted by the dotted line is data of a golf shaft using the conventional technique (quenching in an electric furnace). The amount of retained austenite shown in the transverse axis in FIG. 5 is adjusted by changing quenching conditions. The golf shafts using the present invention and the conventional technique are the same in material and size other than for the quenching.

When the balance of the strength and the toughness are considered, in the golf shaft using the conventional technique, the data of which is denoted by the dotted line in FIG. 5, the amount of retained austenite for obtaining practical properties of the golf shaft is 3 to 8 wt. %. In the golf shaft using the conventional technique, the distribution amount of retained austenite is not changed and is uniform in a thickness direction of the golf shaft, and it is different from that of the present invention. As shown in FIG. 5, in the golf shaft of the present invention, when the amount (volume %) of retained austenite of the golf shaft, which is included within a range of depth of 3 μm from the surface of the golf shaft, exceeds 30 volume %, a breaking load is smaller than the minimum of the breaking load of the golf shaft of the conventional technique. Thus, in order to obtain the breaking load higher than that of the conventional technique, the amount (volume %) of retained austenite of the golf shaft, which is included within a range of depth of 3 μm from the surface of the golf shaft, is desirably 30 volume % or less.

Figure 6:
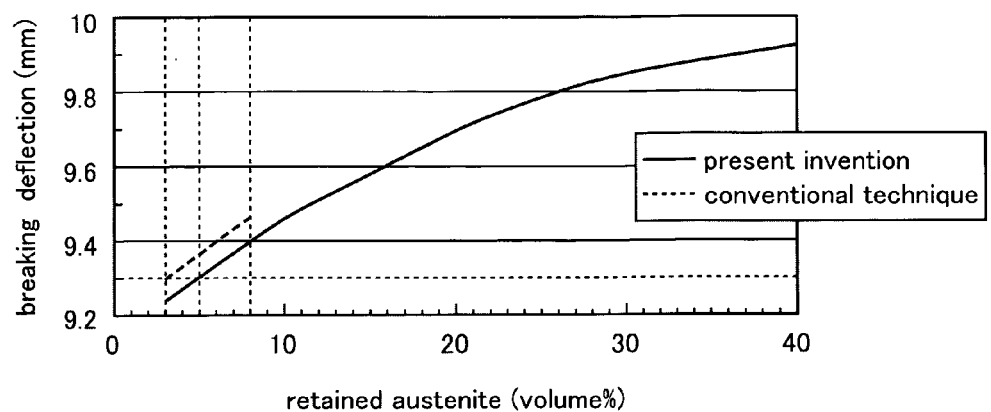
FIG. 6 is a graph showing the relationship between the included amount of the retained austenite and the breaking deflection.

FIG. 6 is one example of data showing the relationship between the included amount (volume %) of retained austenite and the breaking deflection (mm) within a range of depth of 3 μm from the surface of the golf shaft 11. In FIG. 6, the data denoted by the solid line is data of a golf shaft using the present invention, and the data denoted by the dotted line is data of a golf shaft using the conventional technique (quenching in an electric furnace). The amount of retained austenite shown in the transverse axis in FIG. 6 is adjusted by changing quenching conditions. The golf shafts using the present invention and the conventional technique are the same in material and size other than for the quenching.

As shown in FIG. 6, in the golf shaft of the present invention, when the amount (volume %) of retained austenite of the golf shaft, which is included within a range of depth of 3 µm from the surface of the golf shaft, is less than 5 volume %, the breaking deflection is smaller than the minimum of the breaking deflection of the golf shaft of the conventional technique. Thus, in order to obtain a breaking deflection that is higher than that of the conventional technique, the amount (volume %) of retained austenite of the golf shaft, which is included within a range of depth of 3 µm from the surface of the golf shaft, is desirably 5 volume % or more.

In an overall study of the data shown in FIGS. 5 and 6, when the breaking load or the breaking deflection of the golf shaft using the present invention are equal to that of the golf shaft using the conventional technique, the breaking load or the breaking deflection of the golf shaft using the present invention is greatly superior to that of the golf shaft using the conventional technique. The breaking load is a value defining whether or not the strength is good. The higher the breaking load, the higher is the strength. The breaking deflection is a value defining whether or not toughness is good. The higher the breaking deflection, the higher is the toughness. Thus, from a viewpoint of a balance in the strength and the toughness, the golf shaft using the present invention, which satisfies the above value ranges, is superior to the golf shaft using the conventional technique. That is, the amount (volume %) of retained austenite of the golf shaft, which is included within a range of depth of 3 µm from the surface of the golf shaft, is 5 to 30 volume %, so that the strength and the toughness of the golf shaft using the present invention can be higher than those of the golf shaft using the conventional technique.

Figure 7:
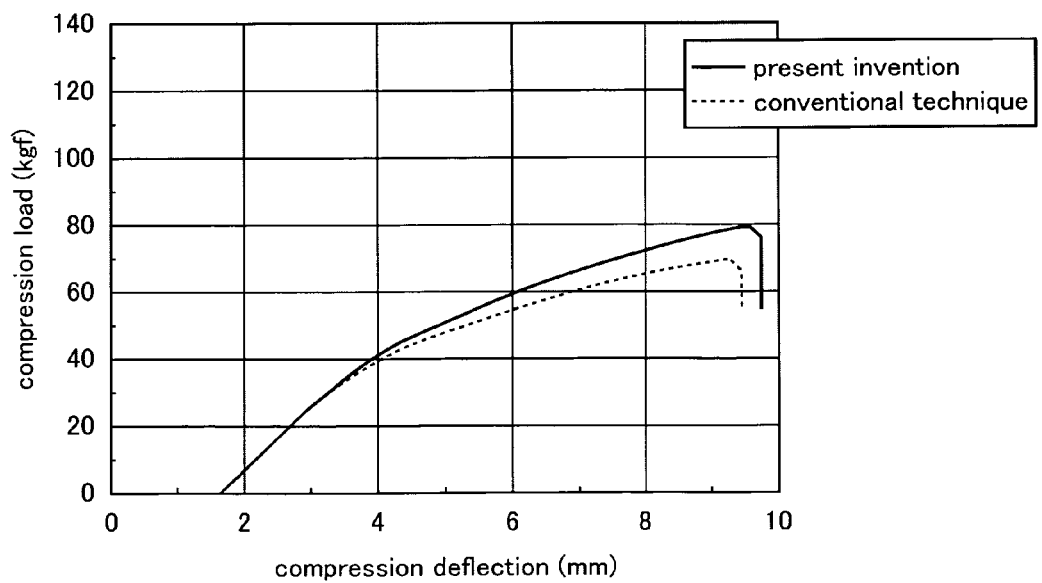
FIG. 7 is a graph showing the results of a flattening test.

FIG. 7 shows the comparison data of results of flattening test performed on golf shafts using the present invention and the conventional technique. The golf shaft using the conventional technique includes retained austenite uniformly in a thickness direction thereof, and it is a sample which endures the highest compression load. As shown in FIG. 7, the golf shaft using the present invention endures the higher compression load, and exhibits the larger compression deflection. Thus, the strength and the toughness of the golf shaft using the present invention can be higher than those of the golf shaft using the conventional technique.

The reasons that the above superior characteristics can be obtained are as follows. That is, when the included amount of retained austenite is uniform in a thickness direction of golf shaft, the margin for generating the transformation-induced plasticity is small, so that the deformability of the golf shaft is small, and breakage due to bending stress applied to the golf shaft easily occurs. Since the amount of retained austenite that does not contribute to transformation-induced plasticity is excessive at a portion deep from a surface of the golf shaft, the strength of the golf shaft is decreased. Due to this, as shown in FIG. 7, the compression deflection and the compression load immediately before breakage are smaller than those of the golf shaft using the present invention.

In contrast, when the included distribution amount of retained austenite is in a gradient such that the included amount of retained austenite is increased toward the outer surface of the golf shaft, the margin for generating the transformation-induced plasticity is large, so that the deformability of the golf shaft is large, and breakage due to bending stress applied to the golf shaft is prevented. Since the amount of retained austenite which does not contribute to transformation-induced plasticity is small at a portion deep from a surface of the golf shaft, the strength of the golf shaft can be high. Thus, as shown in FIG. 7, the compression deflection and the compression load immediately before breakage are larger than those of the golf shaft using the present invention.

Figure 8:
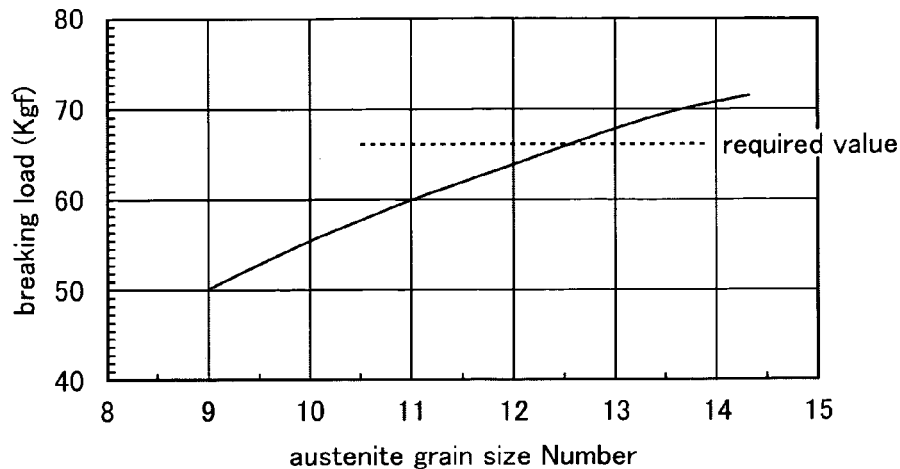
FIG. 8 is a graph showing the relationship between the austenite grain size number of the austenite generated during heating of golf shaft and the breaking load in the golf shaft.
Figure 9:
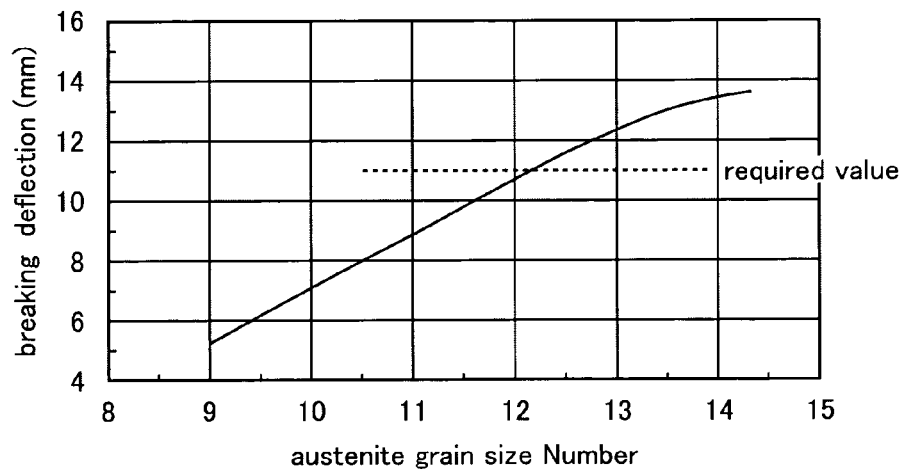
FIG. 9 is a graph showing the relationship between the austenite grain size number of the austenite generated during heating of golf shaft and the breaking deflection in the golf shaft.

FIG. 8 is a graph showing the relationship between austenite grain size number of austenite generated during heating of golf shaft and breaking load in the golf shaft. FIG. 9 is a graph showing the relationship between austenite grain size number of austenite generated during heating of golf shaft and breaking deflection in the golf shaft. As shown in FIGS. 8 and 9, when the grain size of the austenite is fine such that the austenite grain size number is 12.5 or more (the average grain diameter is 5 µm or less), the breaking load and the breaking deflection are improved, and they satisfy the required values of the golf shaft. That is, in order to satisfy the strength and the toughness of the golf shaft, it is necessary to make fine the grains of the golf shaft such that the austenite grain size number is 12.5 or more.

Figure 10:
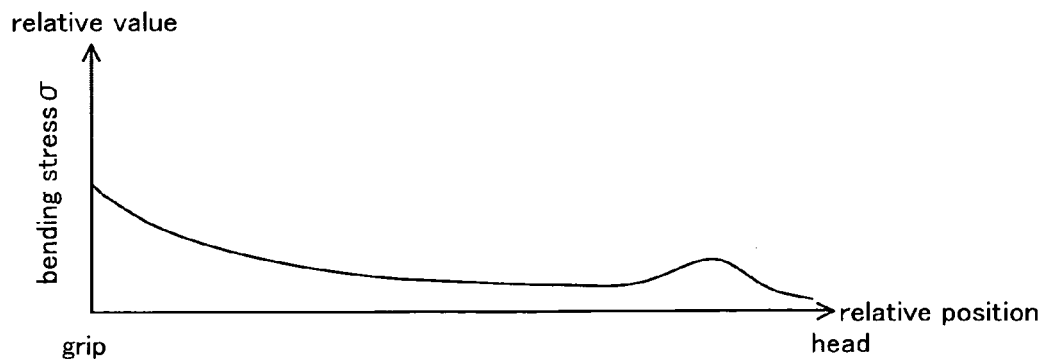
FIG. 10 is a graph showing a distribution of the bending stress applied in a longitudinal direction of a golf shaft.

Example of Changing Amount of Retained $\gamma$ (Retained Austenite) in Longitudinal Direction When a golf shaft is swung in general, a large stress is applied to a grip side of the golf shaft. FIG. 10 is a graph showing a distribution of stress σ applied in a longitudinal direction of a golf club when the golf shaft is swung. As shown in this example, in general, the bending stress (rigidity) is maximal at the grip side. Thus, the strength and the toughness at the grip side of the golf shaft are set to be high, so that the golf club can be thin and light in weight overall, and breakage of golf club can be prevented. One example of this technical idea is described as follows.

Figure 11:
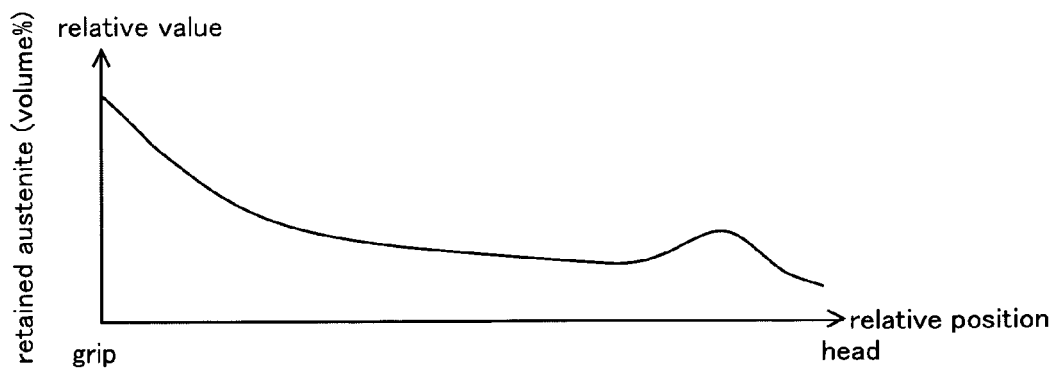
FIG. 11 is a graph showing a distribution of the retained austenite in a longitudinal direction of a golf shaft.

FIG. 11 is a graph showing a distribution of retained austenite in a longitudinal direction of golf shaft. In an example shown in FIG. 11, the amount of retained austenite is adjusted to be large at the grip side. As a result, the strength and the toughness at the grip side can be higher. In this manner, the balance of the strength and the toughness based on the applied stress distribution can be set.

The distribution of retained austenite in a longitudinal direction is set in the condition shown in FIG. 11, so that the following advantages can be obtained. That is, the diameter of golf shaft is relatively large at the grip side and is gradually or step-by step smaller toward the head side. In general, in straitening of the bent portion, the grip side having a larger diameter may be easily collapsed and deformed. When the distribution of retained austenite is set in the condition shown in FIG. 11, the deformability can be improved at the grip side, so that collapse deformation can be prevented in straightening of bent portion. That is, transformation-induced plasticity due to bending stress more easily occurs at the grip side, so that generation rate of defective portion can be reduced in the straitening. Since generation rate of transformation-induced plasticity in which retained austenite is transformed into a martensite structure is greatly larger toward the grip side, the distribution of retained austenite is good for improvement of toughness of steel shaft.

The amount of retained austenite can be adjusted by controlling quenching conditions in the following quenching apparatus. Specifically, frequency and supply electric power are adjusted so that quenching temperature is higher. Thus, the amount of retained austenite can be increased. On the other hand, frequency and supply electric power are adjusted so that quenching temperature is lower. Thus, the amount of retained austenite can be reduced.

There are various kinds of golf club (for example, a wood club, an iron club, a sand wedge, and a putter). Required properties are different depending on the kinds of golf club. In the above manner, the amount of retained austenite is changed in the longitudinal direction of the golf shaft, so that the strength distribution of the golf shaft is adjusted. As a result, the required strength distribution of the golf shaft can be obtained in accordance with the kinds of golf club.

In golf shafts, a high strength portion is positioned at a front end side (narrow diameter side) or at a middle position in a longitudinal direction. In this case, the amount of retained austenite is changed in the longitudinal direction of the golf shaft, the required balance of the strength and the toughness can be obtained.

Example of Varying Austenite Gain Size Number of Austenite Generated During Heating in Longitudinal Direction The austenite grain size number of austenite generated during heating of golf shaft is controlled in a longitudinal direction of the golf shaft, so that the strength of the golf shaft can be adjusted in the longitudinal direction of golf shaft. By using this method, the strength distribution required by a predetermined kind of golf club can be obtained. For example, the austenite grain size number is larger (that is, the grain is finer) toward the grip side, so that the strength of the golf shaft can be higher toward the grip side. The austenite grain size number is freely adjusted in the longitudinal direction of golf shaft, so that the above property can be obtained.

The adjustment of the austenite grain size number can be performed by heating conditions in the following high-frequency quenching apparatus. Specifically, the value of high-frequency electrical power supplied to a heating coil of the high-frequency quenching apparatus is decreased, and moving speed of golf shaft is increased, so that the grain size of austenite is smaller (the austenite grain size number is larger). In a condition opposite to the above condition, the grain size of austenite is larger (the austenite grain size number is smaller). The relationship between the grain size and the quenching conditions can be obtained by preliminary experiments.

Construction of Quenching Apparatus

A quenching apparatus for quenching of golf shaft will be explained hereinafter. In this quenching apparatus, inert gas is supplied into a golf shaft, and pressure of the inert gas is higher than that in the surrounding, so that the position of oil surface in the golf shaft is controlled.

Figure 12:
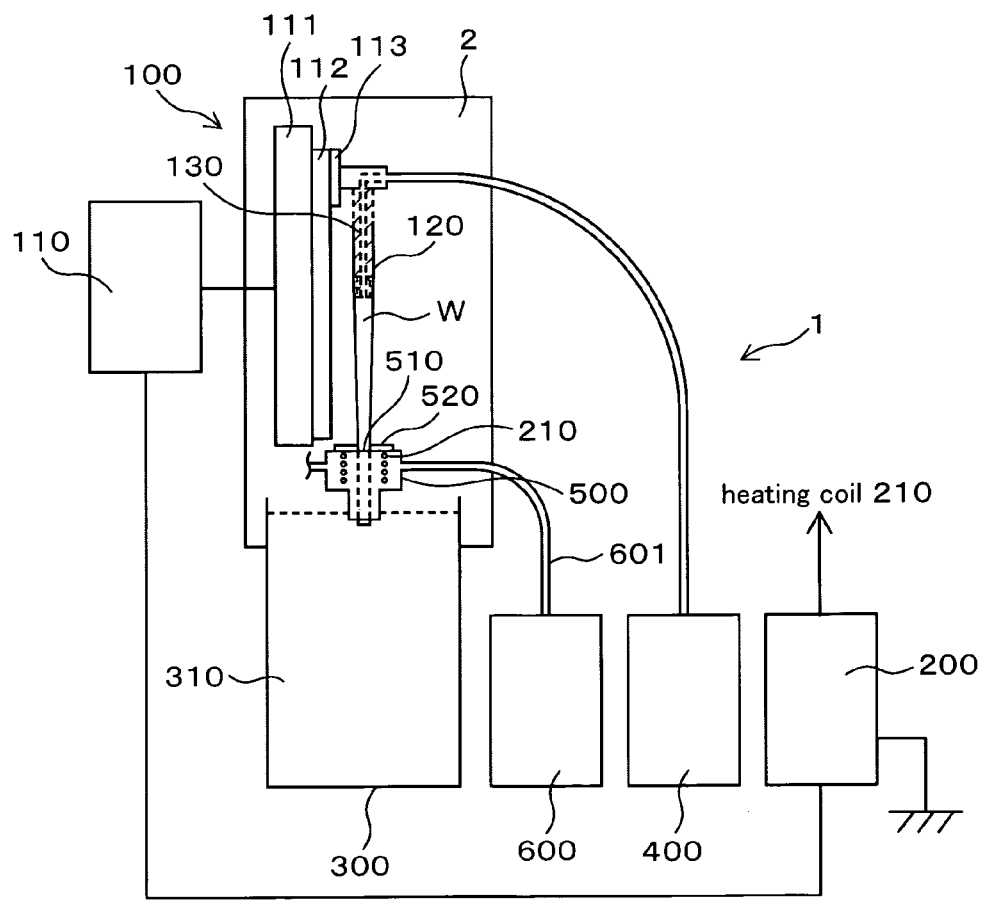
FIG. 12 is a conceptual diagram showing a schematic construction of a quenching apparatus.

FIG. 12 is a conceptual diagram showing a schematic construction of a quenching apparatus. In FIG. 12, a quenching apparatus 1 is shown. The quenching apparatus 1 is equipped with a carrying device 100, a control device 110, a high-frequency power source 200, an oil tank 300, a shaft gas supply device 400, a chamber 500, and a chamber gas supply device 600.

In quenching using the apparatus 1 shown in FIG. 12, since intrusion of quenching oil 310 is restricted to the inside of the golf shaft W having a hollow tubular structure, boiling of the quenching oil 310 in the inside of the golf shaft W does not occur. Thus, explosion of the quenching oil 310 due to the boiling thereof in the inside of the golf shaft can be prevented. If the explosion of the quenching oil 310 occurs, rapid cooling of a heating portion of the golf shaft W is blocked, and the cooling is performed unequally. As a result, the composition of the golf shaft W after the quenching and a metal structure thereof are not uniform, so that the strength of the golf shaft is greatly deteriorated.

The carrying device 100 moves the golf shaft vertically. The carrying device 100 is controlled by the control device 110. The control device 110 controls not only the action of the carrying device 100 but also the action of the high-frequency power source 200.

The carrying device 100 is fixed on a mounting plate 2 which is fixed so as to stand vertically on a floor on which the quenching device 1 is fixed. The carrying device 100 is equipped with an elevating actuator 111. The elevating actuator 111 has a driving motor (not shown in FIG. 12), and a ball screw driving mechanism (not shown in FIG. 12) which is driven by the driving motor. An elevating cylinder 112 is provided on the elevating actuator 111. A slit extending vertically is provided at a side surface (right side surface in FIG. 12) of the elevating cylinder 112, and a movable pedestal 113 is connected to the above ball screw driving mechanism via the slit. When the ball screw driving mechanism is driven, the movable pedestal 113 moves vertically with respect to the elevating cylinder 112. A guide nozzle fixing portion for fixing of a guide nozzle 120 is fixed on the movable pedestal 113. In this mechanism, the ball screw driving mechanism in the elevating actuator 110 is controlled based on control signal from the control device 110, and the guide nozzle 120 can be thereby moved vertically.

The guide nozzle 120 is made of a nonconductive and nonmagnetic member (for example, a ceramic). A front end of the guide nozzle 120 is press-fitted into a back end of the golf shaft W, and the golf shaft W is fixed on the guide nozzle 120. A fixing construction of the golf shaft W with respect to the guide nozzle 120 may be another construction using a tightening member or the like. Since the guide nozzle 120 is made of a nonconductive and nonmagnetic member, the guide nozzle 120 is not inductively heated even when the guide nozzle 120 moves in the heating coil 210.

The guide nozzle 120 has a hollow structure 130 for supplying a gas. The guide nozzle 120 is connected to an upper end of the golf shaft W so as to move the golf shaft W vertically. The guide nozzle 120 uses the hollow structure 130 so as to supply an inert gas (for example, nitrogen gas), which is supplied from the shaft gas supply device 400, into the golf shaft W.

Reference numeral 210 denotes a heating coil. The high-frequency electric power is supplied from the high-frequency power source 200 to the heating coil 210. The heating coil 210 has a solenoid coil structure, and the golf shaft W moves vertically along an axis which is positioned about the axial center of the heating coil 210. The high-frequency power source 200 is controlled by the control device 110. A high-frequency electric current is supplied from the high-frequency power source 200 to the heating coil 210, so that induction heating is performed on the golf shaft W moving in the heating coil 210.

A high-frequency voltage supplied from the high-frequency power source 200 to the heating coil 210 is controlled so that the heated condition of the golf shaft W is adjusted. Thus, grains of the austenite included in the golf shaft W are made fine. The distribution and the rate of the retained austenite can be adjusted to be appropriate values. Thus, a shaft member superior in balance of the strength and the toughness can be obtained. The high-frequency power supplied from the high-frequency power source 200 to the heating coil 210 has a frequency of about 30 to 200 kHz and a supply power of about 10 to 120 kW. The heating conditions are obtained by preliminary experiment, and they are controlled by a computer control based on the experimentally obtained heating conditions.

In one control example of the control device 110, the high-frequency voltage supplied from the high-frequency power source 200 is set high at a portion of the golf shaft W having a small outer diameter, and the high-frequency voltage supplied from the high-frequency power source 200 is set low at a portion of the golf shaft W having a large outer diameter. Thus, the effects by the quenching can be uniform.

The oil tank 300 stores the quenching oil 310. The oil tank 300 is formed to have a depth such that the overall of the golf shaft W, which stands vertically, is immersed in the quenching oil 310. The golf shaft W subjected to high-frequency heating is immersed in the quenching oil 310 from the front end of the golf shaft W, and the heated portion by the induction heating is sequentially cooled by the quenching oil 310. Commercial cooling oil having a boiling point of about 500 degrees C. is used as the quenching oil 310. The reason for use of the oil as cooling liquid is as follows. That is, the cooling rate by the oil is slower than that by the water, and the boiling point of the oil is high, so that unevenness of the cooling rate in the golf shaft W is avoided.

The shaft gas supply device 400 supplies an inert gas (for example, nitrogen gas) into the golf shaft W via the guide nozzle 120. Thus, the intrusion of the quenching oil 310 from the front end of the golf shaft W to the inside thereof is restricted. In this example, when the front end of the golf shaft W is immersed in the quenching oil 310, the shaft gas supply device 400 changes the pressure of the inside of the golf shaft W, which is with respect to the outer pressure (atmosphere pressure, normal pressure), to a large value, and the oil surface position of the quenching oil 310 which is inside the golf shaft W is adjusted so as to be lower than the oil surface position of the quenching oil 310 which is outside the golf shaft W by the shaft gas supply device 400.

The chamber 500 covers the heating coil 210 and the heated portion of the golf shaft W, and it is disposed such that the lower end of the chamber 500 contacts the oil surface of the quenching oil 310. An inert gas (for example, nitrogen gas) is supplied from the chamber gas supply device 600 to the chamber 500 via a pipe 601, so that the inner pressure of the chamber 500 is adjusted.

The chamber 500 has an opening 510. A seal member 520, which is composed of a heat-resistant rubber and has an opening at the center portion thereof, is disposed at the opening 510. The golf shaft W is inserted into the opening of the seal member 520, and the golf shaft W is movable in the opening of the seal member 520. The seal member 520 closes a gap between the golf shaft W, which passes through the opening 510, and the chamber 500. Since the opening of the seal member 520 has a diameter smaller than that of minimum outer diameter portion of the golf shaft W, the golf shaft W having the diameter larger than that of the opening of the seal member 520 constantly contacts the seal member 520 by elastic deformation of the rubber. Thus, even when the golf shaft W, which has an outer diameter changing in a longitudinal direction, moves vertically, generation of gap between the golf shaft W and the chamber 500 is prevented at an upper portion of the chamber 500. Thus, the pressure of the inert gas supplied in the chamber 500 is easily adjusted so as to be higher than the atmosphere pressure. The consumption amount of the inert gas supplied to the chamber 500 can be reduced.

As shown in FIG. 12, the chamber gas supply device 600 supplies the inert gas to the chamber 500 in the left direction and in the right direction. In FIG. 12, the right side pipe 601 for supplying an inert gas from the chamber gas supply device 600 to the chamber 500 is shown.

The pressure in the chamber 500 is higher than the atmosphere pressure, so that the chamber 500 is filled with the inert gas, and generation of oily smoke can be prevented. The oxidation of the heated golf shaft W can be prevented. The supply of inert gas to the chamber 500 is adjusted such that the pressure in the chamber 500 is lower than the pressure of the inner portion of the golf shaft W.

Production Method Example of Golf Shaft

Next, one example of production method including quenching, tempering, and straightening of bent portion will be explained hereinafter. First, as shown in FIG. 12, the front end of the guide nozzle 120 of the carrying device 100 is connected to the back edge of the golf shaft W. The high-frequency electric current is supplied from the high-frequency power source 200 to the heating coil 210. An inert gas is supplied from the chamber gas supply device 600 to the chamber 500, and an inert gas is supplied from the shaft gas supply device 400 to the inside of the golf shaft W via the guide nozzle 120. In this case, for example, the pressure in the chamber 500 and the golf shaft W is 1.5 atm. The unit "1 atm" is defined as a pressure (atmospheric pressure) by using the environmental pressure, in which the quenching device 1 is disposed, as a standard.

The guide nozzle 120 is moved downward by the control device 110, and the golf shaft W is moved downward from the upper side of the heating coil 210. In this case, the golf shaft W is moved on the central axis of the heating coil 210. When the golf shaft W is moved in the heating coil 210, induced electric current is supplied to the golf shaft W, so that the golf shaft W is inductively heated. When the golf shaft W is moved, the value of the voltage applied on the heating coil 210 is controlled based on the change of the golf shaft W in outer diameter and thickness, so that the heating conditions are controlled. This control is performed by using data that was obtained by experiment beforehand.

When the golf shaft W is moved downward to some degree, the golf shaft W is immersed in the quenching oil 310 in the oil tank 300 from the front end of the golf shaft W. In this case, the heated portion of the golf shaft W is cooled, and quenching is performed. When the front end of the golf shaft W is immersed in the quenching oil 310 in the oil tank 300, the pressure of the inert gas supplied from the shaft gas supply device 400 is increased, so that the intrusion of the quenching oil 310 from the front end of the golf shaft W to the inside of the golf shaft W is prevented. In this example, the pressure of the inert gas supplied from the shaft gas supply device 400 is adjusted such that the position of the oil surface in the inner portion of the golf shaft W having a tubular shape is approximately set at the front end portion of the golf shaft W. This pressure adjustment is performed based on the data obtained by preliminary experiment. In the condition after the front end of the golf shaft W is immersed in the quenching oil 310, the pressure in the golf shaft W is higher than that in the chamber, and the pressure in the chamber is higher than the atmosphere pressure.

The golf shaft W is moved downward, and the heating by the electric current induced from the heating coil 210 is thereby gradually performed on the golf shaft W upward from the front end portion thereof. The heated portion of the golf shaft W is immersed in the quenching oil 310, thereby being cooled. When the front end (or a predetermined portion) of the golf shaft W is immersed in the quenching oil 310, the high-frequency electric current supplied to the heating coil 210 is set zero. After that, the golf shaft W is moved upward. In this manner, the quenching of the golf shaft W is finished.

The tempering using a tempering apparatus (not shown in the Figures) is performed on the golf shaft W subjected to the quenching. The tempering is performed by using a typical method.

Then, a tempered golf shaft W is tested by a bent test apparatus (not shown in the Figures), and a bent one is separated. A golf shaft W requiring straightening is subjected to straightening using a straightening apparatus (not shown in the Figures). In the straightening, the golf shaft is forcibly changed in shape so as to have a predetermined shape (typically, a linear shape) by straightening of a small amount of warping or the like. A golf shaft W which does not require straightening is selected by the test apparatus, and it is not subjected to straightening. In this manner, the quenching and the tempering are performed. In this case, the straightening is performed if necessary. Thus, the golf shaft W is produced.

In the above quenching, since explosion of the quenching oil 310 in the golf shaft W is prevented, rapid cooling can be uniformly performed from the outside of the golf shaft W, and decrease of the strength of the golf shaft W can be prevented. In this production method, the above gradient structure of the golf shaft W in which amount of retained austenite is increased toward the surface can be obtained by skin effects.

In the quenching using the apparatus shown in FIG. 12, the value of the supplied high-frequency power and the moving speed (carrying speed) of the golf shaft are adjusted, so that the austenite grain size number (grain diameter) of austenite generated during the quenching (heating) can be adjusted. For example, as the high-frequency power supplied to the heating coil is smaller, and the carrying speed of the golf shaft is faster, the grain diameter of the austenite is smaller (that is, the austenite grain size number thereof is larger). When the conditions of the high-frequency power and the carrying speed are reversed, the grain diameter of the austenite is larger (that is, the austenite grain size number thereof is smaller) Specifically, the relationship of the size of the grain of the austenite and the quenching condition can be obtained by experiment beforehand.

Modification Example

When the quenching using the high-frequency quenching apparatus shown in FIG. 12 is performed, the heated temperature of the golf shaft inner surface (surface of pipe inner surface) is lower than that of the golf shaft outer surface, so that the increase of the included retained austenite amount in the inner surface can be inhibited. Specifically, a magnetic member is disposed at the inner surface of the golf shaft W, and the induction heating is performed such that the skin effect at the golf shaft inner surface is inhibited, so that the increase of the included retained austenite amount in the inner surface can be inhibited. By using this technique, the included distribution amount of retained austenite is realized so as to be substantially the same as that shown in FIG. 4, and the balance of the strength and the toughness of the golf shaft can be more effective.

INDUSTRIAL APPLICABILITY

The present invention can be applied to golf shafts and golf clubs having the same.

What is claimed is:

1. A golf shaft comprising:
a hollow tubular structure; and
a gradient structure in which an amount of retained austenite is increased from an approximate center in a thickness direction of the hollow tubular structure to a surface of the hollow tubular structure.

2. A golf shaft according to claim 1, wherein
the golf shaft includes 5 to 30 volume % of the retained austenite at an outside surface of the hollow tubular structure and in the vicinity of the outside surface.

3. A golf shaft according to claim 1, wherein
in the golf shaft, the amount of the retained austenite is different in a longitudinal direction.

4. A golf shaft according to claim 3, wherein
the golf shaft has a grip side and a head side, and
the amount of the retained austenite is larger at the grip side than at the head side.

5. A golf club comprising:
the golf shaft according to claim 1.

6. A production method for a golf shaft, wherein
the golf shaft comprising: a hollow tubular structure,
the method including: forming a gradient structure in which an amount of retained austenite is increased from an approximate center in a thickness direction of the hollow tubular structure to a surface of the hollow tubular structure.

7. A production method for a golf shaft according to claim 6, wherein
austenite is generated during heating of the golf shaft,
the austenite has an austenite grain size number, and
in the golf shaft, at least one of the amount of the retained austenite and the austenite grain size number of the austenite are different in a longitudinal direction.

8. A production method for a golf shaft according to claim 6, wherein
austenite is generated during heating of the golf shaft, and
the austenite has an austenite grain size number of 12.5 or more.

* * * * *